United States Patent
Kikuchi

[11] Patent Number: 6,149,412
[45] Date of Patent: Nov. 21, 2000

[54] ROTATION PREVENTING MECHANISM USING THRUST BALL BEARING AND SCROLL TYPE COMPRESSOR USING THE SAME

[75] Inventor: Toshiyuki Kikuchi, Isesaki, Japan

[73] Assignee: Sanden Corporation, Gunma, Japan

[21] Appl. No.: 09/366,197

[22] Filed: Aug. 4, 1999

[30] Foreign Application Priority Data

Aug. 5, 1998 [JP] Japan .................................. 10-221591

[51] Int. Cl.$^7$ .................................................. F04C 18/00
[52] U.S. Cl. ......................................... 418/55.3; 464/103
[58] Field of Search ............................ 418/55.3; 464/103

[56] References Cited

U.S. PATENT DOCUMENTS

| | | |
|---|---|---|
| 3,647,268 | 3/1972 | Haines . |
| 4,160,629 | 7/1979 | Hidden et al. . |
| 4,259,043 | 3/1981 | Hidden et al. . |
| 4,406,600 | 9/1983 | Terauchi et al. . |
| 4,457,676 | 7/1984 | Hiraga . |
| 4,468,181 | 8/1984 | Sakamoto ................................ 418/55.3 |
| 4,472,120 | 9/1984 | McCullough . |
| 4,474,543 | 10/1984 | Higara et al. .......................... 418/55.3 |
| 4,492,543 | 1/1985 | Iimori et al. . |
| 4,527,963 | 7/1985 | Terauchi . |
| 4,545,746 | 10/1985 | Sugimoto et al. . |
| 4,589,828 | 5/1986 | Sato et al. . |
| 4,645,435 | 2/1987 | Sugimoto . |
| 4,934,909 | 6/1990 | Suzuki et al. .......................... 418/55.3 |
| 5,102,315 | 4/1992 | Terauchi et al. . |
| 5,221,198 | 6/1993 | Izumi et al. . |
| 5,423,663 | 6/1995 | Fukui . |
| 5,435,706 | 7/1995 | Matsumoto et al. . |
| 5,738,504 | 4/1998 | Kitano ................................... 418/55.3 |
| 5,911,566 | 6/1999 | Terauchi et al. ....................... 418/55.3 |
| 5,915,933 | 6/1999 | Iizuka et al. . |
| 5,938,418 | 8/1999 | Iizuka . |

FOREIGN PATENT DOCUMENTS

| | | |
|---|---|---|
| 0123407 | 10/1984 | European Pat. Off. . |
| 2455196 | 4/1980 | France . |
| 1960216 | 6/1971 | Germany . |
| 59-183090 | 10/1984 | Japan . |
| 63-061790 | 3/1988 | Japan . |
| 63-154878 | 6/1988 | Japan . |
| 63-179185 | 7/1988 | Japan .................................. 418/55.3 |
| 63-266214 | 11/1988 | Japan . |
| 1-077779 | 3/1989 | Japan . |
| 1-219377 | 9/1989 | Japan . |
| 1-271679 | 10/1989 | Japan . |
| 2-308990 | 12/1990 | Japan . |
| 5-033811 | 2/1993 | Japan .................................. 418/55.3 |
| 5-087131 | 4/1993 | Japan .................................. 418/55.3 |
| 5-126040 | 5/1993 | Japan . |
| 5-126140 | 5/1993 | Japan .................................. 418/55.3 |
| 5-087131 | 6/1993 | Japan . |
| 7-019249 | 1/1995 | Japan . |
| 9-310685 | 2/1997 | Japan . |
| 0881409 | 11/1981 | U.S.S.R. . |

OTHER PUBLICATIONS

J. Iizuka et al., "Improvement Of Scroll Compressor For Vehicle Air Conditioning Systems," *Society of Automotive Engineers, Inc.*, 1997.

*Primary Examiner*—Thomas Denion
*Assistant Examiner*—Theresa Trieu
*Attorney, Agent, or Firm*—Baker Botts L.L.P.

[57] ABSTRACT

A rotation preventing mechanism is composed of a thrust ball bearing including a first race section having an annular shape, a second race section disposed at an eccentric position in confrontation with the first race section at intervals and thrust balls interposed between the first and second race sections. The first and second race sections have ball accommodating grooves formed at the confronting surfaces thereof, respectively. Each of the ball accommodating grooves includes a central portion and a groove bottom portion around it. When the radius of curvature of each thrust ball is represented by RB, the radius of curvature of the groove bottom portion on an inner side is represented by Rin and the radius of curvature thereof in an outer side is represented by Rout, and the ball accommodating groove has a shape satisfying a formula RB≦Rin<Rout.

8 Claims, 8 Drawing Sheets

ROTATION PREVENTING MECHANISM USING THRUST BALL BEARING AND SCROLL TYPE COMPRESSOR USING THE SAME

BACKGROUND OF THE INVENTION

1. Field of the Invention

The present invention relates to a thrust ball bearing used in a driving mechanism such as a scroll compressor and the like. More particularly, the present invention relates to a rotation preventing mechanism composed of a thrust ball bearing for improving the assembly characteristics thereof when it is mounted on a structural member, and to a scroll type compressor using the rotation preventing mechanism.

2. Description of the Related Art

Conventionally, scroll type compressors are used in refrigerant circuits for air conditioning apparatuses for vehicles and the like. The scroll type compressor includes a stationary swirl or scroll member fixed in a casing and a movable swirl or scroll member disposed in the casing similarly in confrontation with the stationary scroll member. The movable swirl member executes a turning motion while the rotation thereof is prevented by a rotation preventing mechanism with respect to the stationary swirl member, compresses refrigerant drawn into the casing and discharges the compressed refrigerant to a refrigerant circuit disposed outside the scroll type compressor.

A rotation preventing mechanism is used for preventing the rotation in itself or the revolution around a center line of the stationary swir member and composed of a thrust ball bearing. The thrust ball bearing includes a first race fixed in a casing, a first ring, a second race disposed to the back surface of a movable scroll member, a second ring, and thrust balls interposed between the first and second rings.

The first ring and the first race are arranged integrally with each other to thereby form a first race section, whereas the second ring and the second race are arranged integrally with each other to thereby form a second race section.

In the conventional thrust ball bearing, thrust balls are accommodated in annular ball accommodating grooves which are formed at the confronting surfaces of the first and second race sections, respectively.

In each of the ball accommodating grooves of the race sections of the conventional thrust ball bearing, however, since the groove is in contact with a thrust ball through a convex portion inside a groove bottom portion and through a concave portion outside it, the contact area of the groove and the thrust ball is smaller inside the groove bottom portion. Accordingly, the inner portion of the ball accommodating groove is more stressed and wears more quickly, whereby the life of the thrust ball bearing is shortened.

SUMMARY OF THE INVENTION

It is an object of the present invention to provide a thrust ball bearing for constituting a rotation preventing mechanism of a scroll type compressor and the like which has a long service life and by which the stress limit and durability of the ball accommodating grooves thereof can be improved.

It is another object of the present invention to provide a scroll type compressor using the thrust ball bearing.

According to an aspect of the present invention, there is provided a scroll type compressor including a pair of swirl members disposed in a casing in confrontation with each other and discharging drawn in refrigerant while compressing it by executing a relative turning motion by one of the pair of swirl members while preventing the rotation of one swirl member with respect to the other swirl member by a rotation preventing mechanism. The rotation preventing mechanism is substantially composed of a thrust ball bearing including a first annular race section, a second annular race section disposed in confrontation with the first race section, thrust balls interposed between the first and second race sections. The first and the second annular sections have ball accommodating grooves formed at each of the confronting surfaces of the first and second race sections in which the thrust balls are accommodated so as to turn in a direction along the confronting surfaces. In the scroll type compressore, each of the ball accommodating grooves of at least one of the first and second race sections has a central portion and a groove bottom portion around the central portion. When the radius of curvature of the thrust ball is represented by RB, the radius of curvature of the cross section of each of the ball accommodating grooves inside the groove bottom portion is represented by Rin, and the radius of curvature thereof outside the groove bottom portion is represented by Rout, the ball accommodating groove has a shape satisfying the relationship of an inequality RB≦Rin<Rout.

According to another aspect of the present invention, there is obtained a rotation preventing mechanism substantially composed of a thrust ball bearing including a first annular race section, a second annular race section disposed in confrontation with the first race section, and thrust balls interposed between the first and second race sections. The first and the second annular race sections have ball accommodating grooves formed at each of the confronting surfaces of the first and second race sections in which the thrust balls are accommodated so as to turn in a direction along the confronting surfaces. In the rotation preventing mechanism, each of the ball accommodating grooves of at least one of the first and second race sections has a central portion and a groove bottom portion around the central portion. When the radius of curvature of the thrust ball, the radius of curvature of the cross section of each of the ball accommodating grooves inside the groove bottom portion, and the radius of curvature thereof outside the groove bottom portion are represented by RB, Rin, and Rout, respectively, the ball accommodating groove has a shape satisfying the relationship of the inequality RB≦Rin<Rout.

DESCRIPTION OF THE PREFERRED EMBODIMENTS

A conventional scroll type compressor and a rotation preventing mechanism used therein will be described with reference to FIGS. 1 to 7 so that the present invention can be easily understood.

Figure 1:
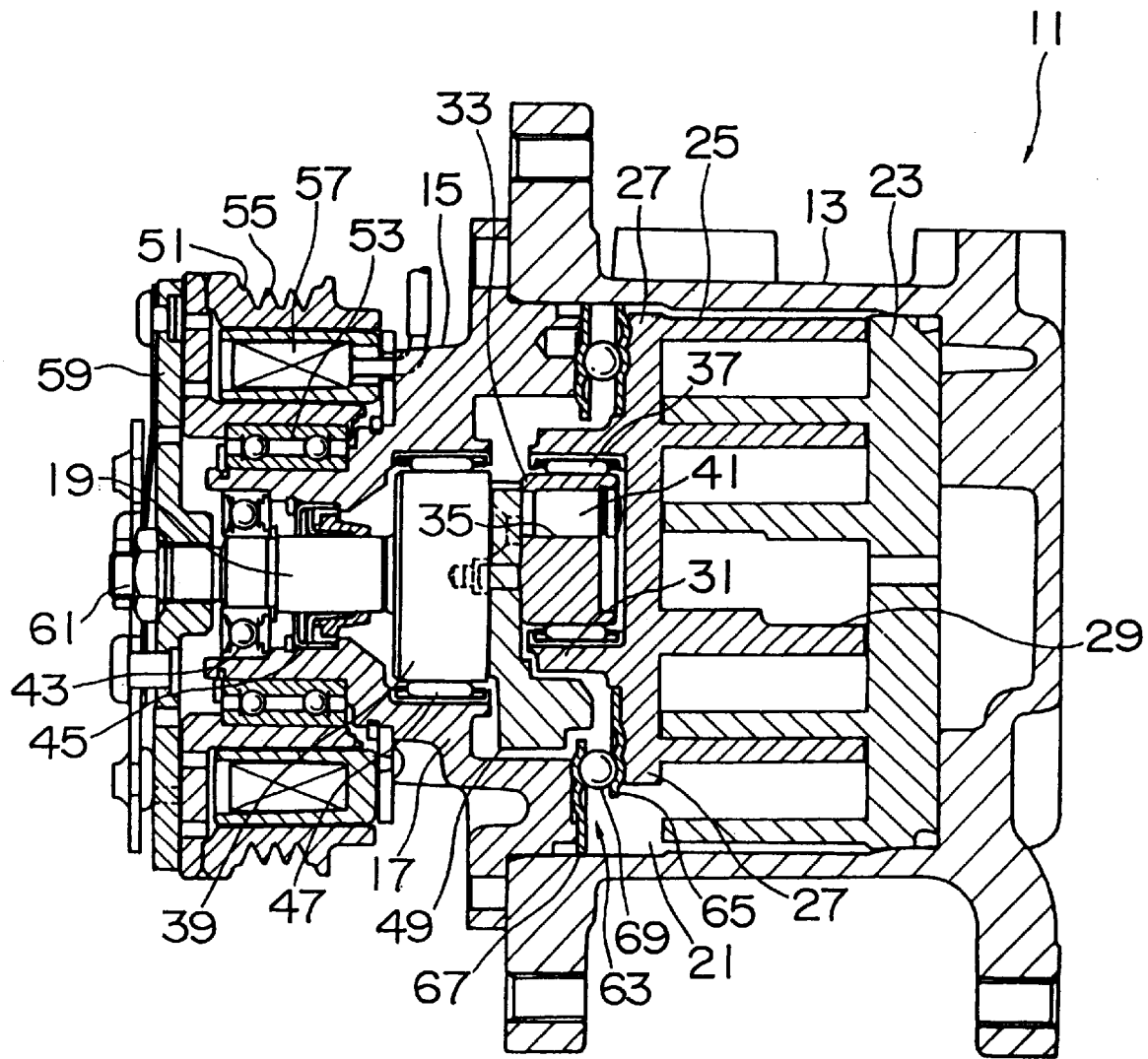
FIG. 1 is a sectional view of a conventional scroll type compressor.

Referring to FIG. 1, a conventional scroll type compressor 11 includes a casing 13 for constituting a shell having an opening at one end thereof, a front housing 15 disposed to the opening at one end of the casing 13, and a crank shaft 19 passing through a projecting section 17 of the front housing 15. A crank chamber 21 is defined and formed by the casing 13 and the front housing 15. The crunk chamber 21 contains a stationary swirl member 23 fixed to the casing 13 and a movable swirl member 25. The movable swirl member 25 is disposed in confrontation with the stationary swirl member 23 and makes a relative turning motion about the central axis of the stationary swirl member 23. The movable swirl member 25 includes a side plate 27, a swirl member 29 disposed to one surface of the side plate 27, and a boss section 31 projecting from the other surface of the side plate 27.

The boss section 31 contains an eccentric bushing 33. The eccentric bush 33 has a through hole 35 formed to the eccentric position thereof as well as the periphery thereof is rotatably supported through a bearing 37. The crank shaft 19 has a large diameter section 39 formed to an end of the crank chamber 21. A crank pin 41 is disposed to the side of the large diameter section 39 opposite to the crank shaft 19 at a position which is eccentric to the central axis of the crank shaft 19. The crank pin 41 is inserted into the through hole 35 of the eccentric bushing 33. The crank shaft 19 in the projecting section 17 is supported by a bearing 43. Further more, a seal member 45 is disposed adjacent to the bearing 43.

The large diameter section 39 of the crank shaft 19 is supported by the front housing 15 through a bearing 47. Note that numeral 49 denotes a counter balance weight for maintaining balance between the movable swirl member 25 and the shaft.

An electromagnetic clutch 51 is disposed around the projecting section 17 of the front housing 15. The electromagnetic clutch 51 includes an annular hollow rotor 55 disposed around the projecting section 17 through a bearing 53 and an electromagnet device 57 disposed in the rotor 55. Further more, the electromagnetic clutch 51 is disposed in confrontation with the outer end surface of the rotor 53 and includes a clutch plate 59 which is composed of an armature and a clutch hub connected thereto through a plate spring. The clutch plate 59 is fixed to one end of the crank shaft 19 through a fixing member 61 at the center thereof.

In the crank chamber 21, a rotation preventing mechanism 63 is disposed around the boss section 31 on the other end of the side plate 27 of the movable swirl member 25 and on the inner wall of the front housing 15.

The rotation preventing mechanism 63 includes a movable race 65 disposed at the movable swirl member 25, a stationary race 67 fixed to the inner wall of the front housing 15, and thrust balls 69 interposed between the movable race 65 and the stationary race 67.

Figure 2:
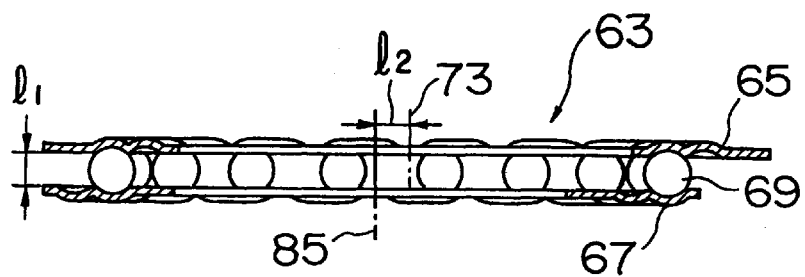
FIG. 2 is a sectional view showing a conventional thrust ball bearing.

Referring to FIG. 2, the rotation preventing mechanism 63 is composed of a thrust ball bearing and includes the first race section 65 as the movable race, the second race section 67 as the stationary race disposed in confrontation with the first race section 65 at intervals, and the thrust balls 69 held between the first and second race sections 65 and 67.

Figure 3A:
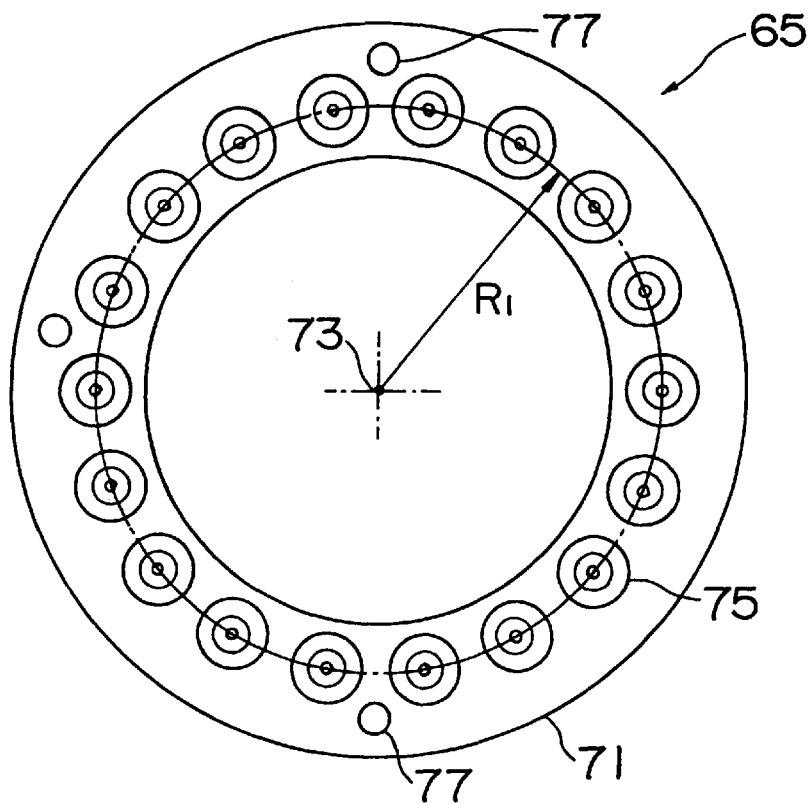
FIGS. 3A and 3B are a front elevational view and a sectional view showing a first race section.

As shown in FIG. 3A, the first race section 65 includes an annular race plate member 71, a plurality of embossed ball accommodating grooves 75 which are concentrically disposed about the central axis 73 of the race plate member 71, and fixing holes 77 for mounting the first race section 65 to the inside of a structural member through pins (not shown).

Figure 3B:
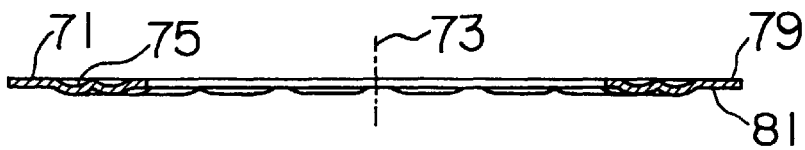

As shown in FIG. 3B, each of the ball accommodating grooves 75 has a concave portion formed at one surface 79 thereof and a convex portion formed at the other surface 81 thereof. The concave portion formed at the one surface 79 is higher at the center thereof than at the periphery thereof so that the ball accommodating grooves 75 form a ring-shaped ball transfer groove.

Figure 4A:
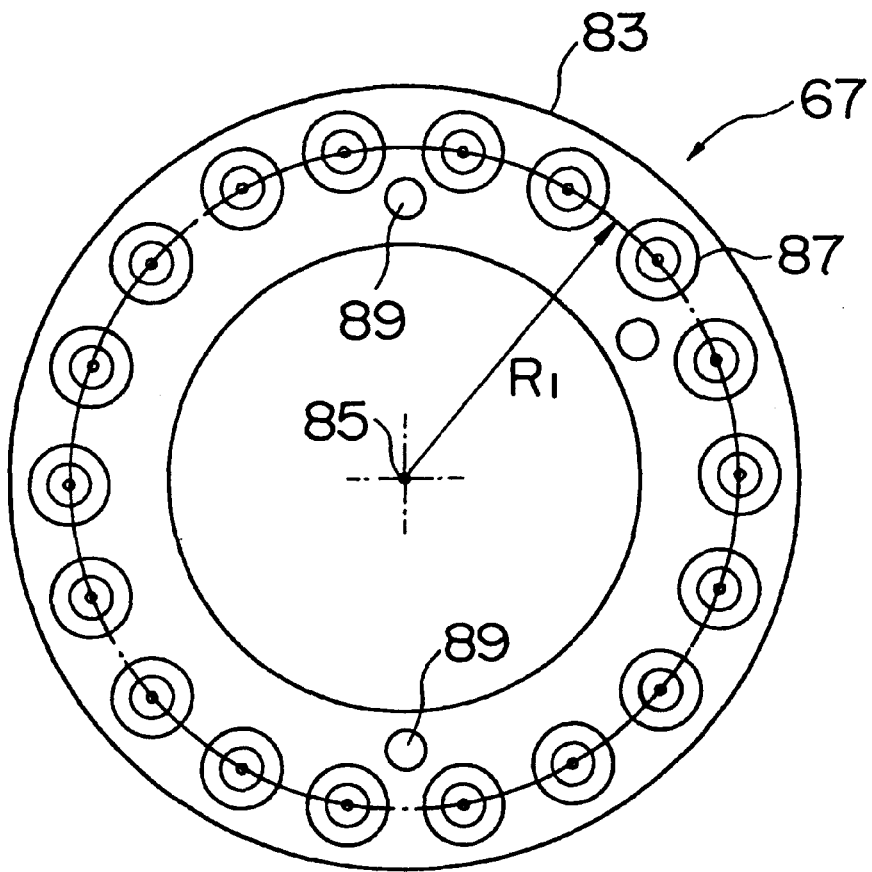
FIGS. 4A and 4B are a front elevational view and a sectional view showing a second race section.

As shown in FIG. 4A, the outside diameter of the second race section 67 is smaller than that of the first race section 65. The second race section 67 includes an annular race plate member 83, a plurality of ball accommodating grooves 87 concentrically disposed about a central axis 85 of the race plate member 83 and fixing holes 89 for mounting the second race section 67 to the inside of the structural member.

Figure 4B:
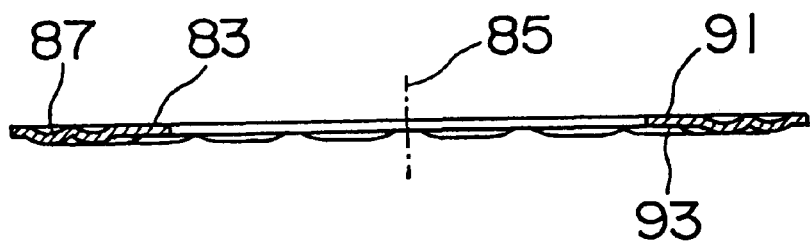

As shown in FIG. 4B, each of the ball accommodating grooves 87 has a concave portion formed at one surface 91 thereof and a convex portion formed at the other surface 93 thereof, similarly to the first race section 65. The concave portion formed at the one surface 91 is higher at the center thereof than on the periphery thereof so that the ball accommodating grooves 87 form a ring-shaped ball transfer groove.

Figure 5A:
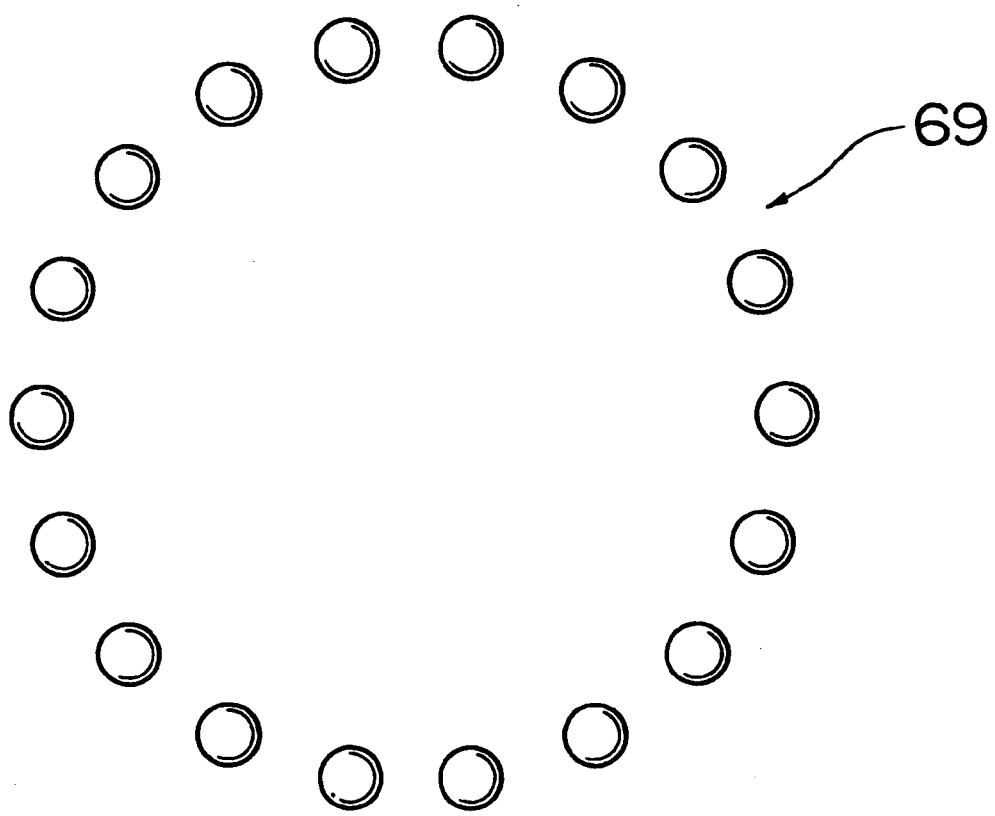
FIGS. 5A and 5B are a front elevational view and a sectional view showing thrust balls.
Figure 5B:
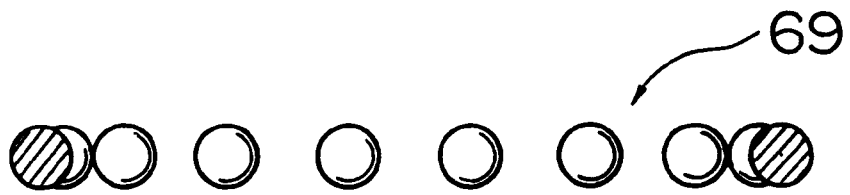

As shown in FIGS. 5A and 5B, each of the thrust balls 69 is made of a steel ball.

As shown in FIG. 2, the first and second race sections 65 and 67 are disposed in confrontation with each other at predetermined intervals 11 through the thrust balls 69 disposed in the respective concave portions. In the conventional example, the second race section 67 makes a relative turning motion about the central axis 85 with respect to the central axis 73 of the first race section 65 while the rotation thereof is prevented.

Figure 6:
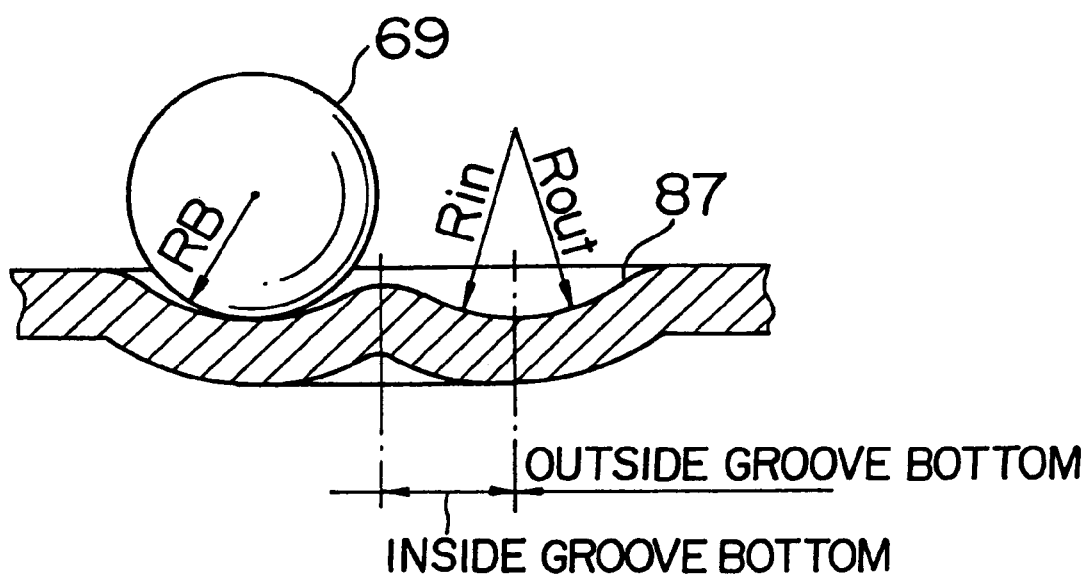
FIG. 6 is a sectional view showing a conventional drawback of a thrust ball bearing.

FIG. 6 is a sectional view showing the ball accommodating groove 87 of the conventional thrust ball bearing. As shown in FIG. 6, in the cross section of the ball accommodating groove 87, when the radius of curvature of the thrust ball 69 is represented by RB, the radius of curvature of the portion of the ball accommodating groove 87 which is located inside the groove bottom portion thereof is represented by the Rin and the radius of curvature of the portion of the ball accommodating groove 87 which is located outside the groove bottom portion thereof is represented by Rout, the following formula (1) is established.

$$RB < Rin = Rout \qquad (1)$$

Figure 7:
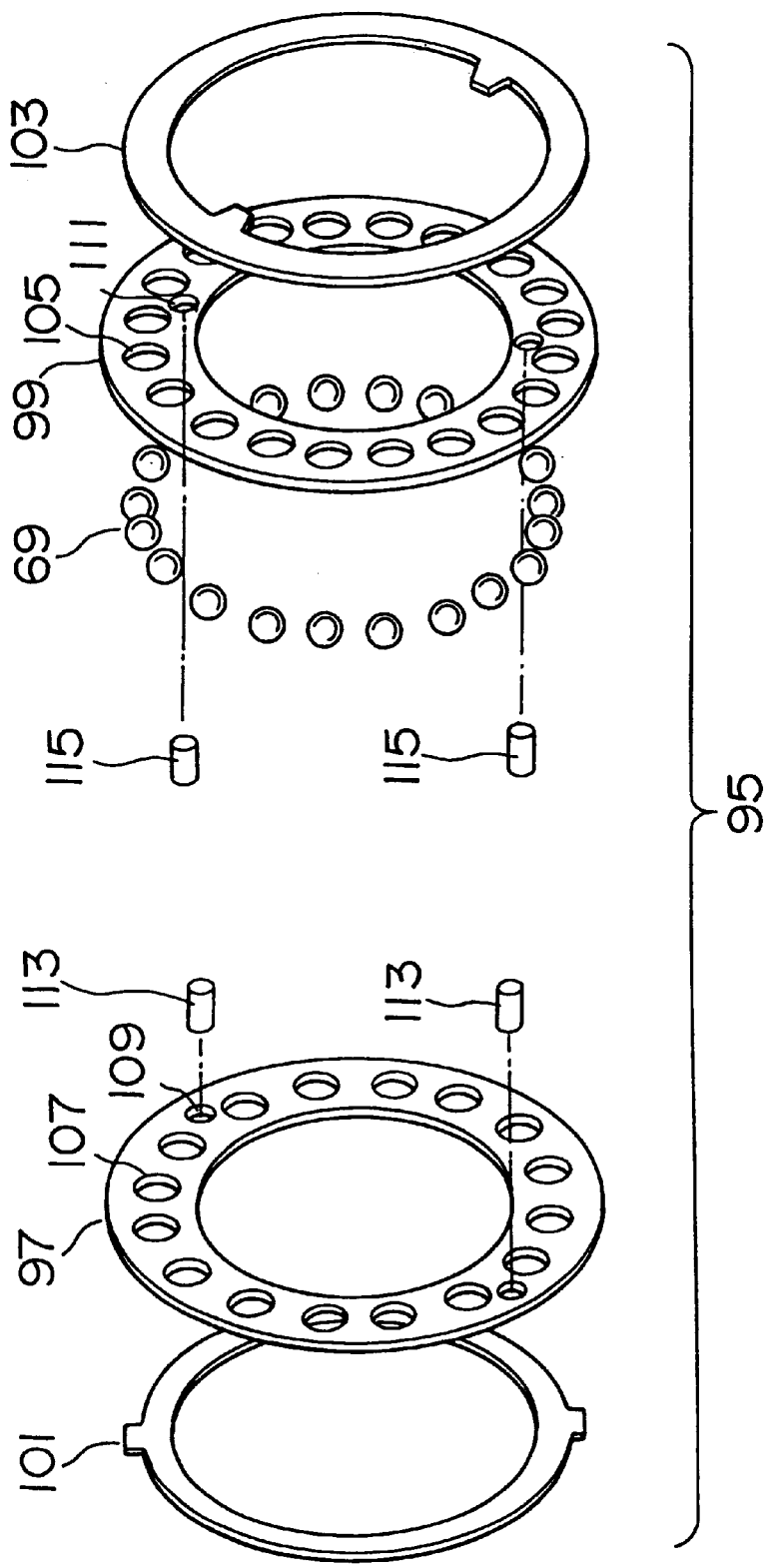
FIG. 7 is a perspective view showing another example of the conventional thrust ball bearing.

In contrast, as shown in FIG. 7, in another example of the rotation preventing mechanism of the conventional scroll type compressor, rings 97 and 99 and races 101 and 103 are formed as separate members. Ball accommodating holes 105 and 107 are concentrically formed at the rings 99 and 97, respectively. The thrust balls 69 are accommodated between the ball accommodating holes 105 and 107, and the races 101 and 103 are disposed outside the thrust balls 69 so that the thrust balls 69 come into contact with the surfaces of the races 101 and 103. The rings 97 and 99 are fixed to the front housing and to the movable scroll member by pins 113 and 115 through fixing holes 109 and 111, respectively.

Now, an embodiment of the present invention will be described with reference to FIGS. 8 to 10. Since the scroll type compressor according to the embodiment of the present invention is arranged similarly to the conventional scroll type compressor shown in FIG. 1, except for the portion of a thrust ball bearing acting as a rotation preventing mechanism, detailed description thereof is omitted.

The rotation preventing mechanism according to the embodiment of the present invention comprises a thrust ball bearing including a stationary race section fixed in a casing, a movable race section fixed to the back surface of a movable swirl member and thrust balls interposed between the stationary race section and the movable race section.

First, a first embodiment of the present invention will be described with reference to FIGS. 8A and 8B.

Figure 8A:
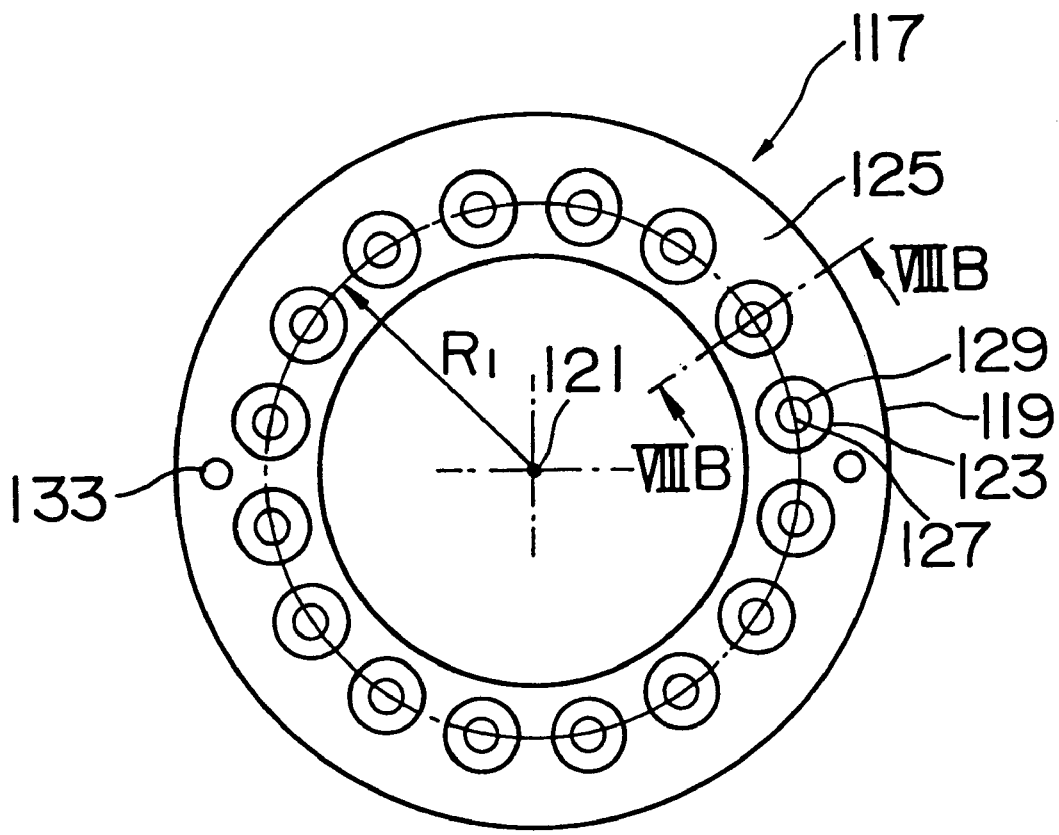
FIG. 8A is a front elevational view of a stationary race section of a thrust ball bearing according to an embodiment of the present invention.
Figure 8B:
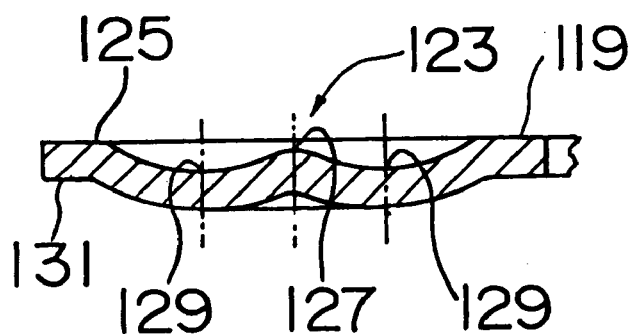
FIG. 8B is a sectional view taken along the line VIIIB—VIIIB in FIG. 8A.

Referring to FIGS. 8A and 8B, a stationary race section 117 of the thrust ball bearing acting as the rotation preventing mechanism includes an annular race plate member 119 and embossed ball accommodating grooves 123 disposed on a concentric circle having a radius R1 formed about a central axis 121 of the race plate member 119.

As shown in FIG. 8B, each of the ball accommodating grooves 123 includes, on the one surface 125 thereof, a central portion 127 and a ring-shaped concave groove portion 129 with a round bottom which is formed around the central portion 127. In contrast, the ball accommodating groove 123 forms, on the other surface 131 side thereof, a ball transfer groove which includes a ring-shaped peripheral portion having an upper circular projection and a concave portion at the center thereof, contrary to the one surface 125 side.

Further, the stationary race section 117 has fixing holes 133 formed at positions thereof which are located outside the concentric circle having the radius R1. The fixing holes 133 are used to secure the stationary race section 117 through pins to portions where the driving mechanism of a compressor is supported.

Next, a second embodiment of the present invention will be described with reference to FIG. 9A and FIG. 9B.

Figure 9A:
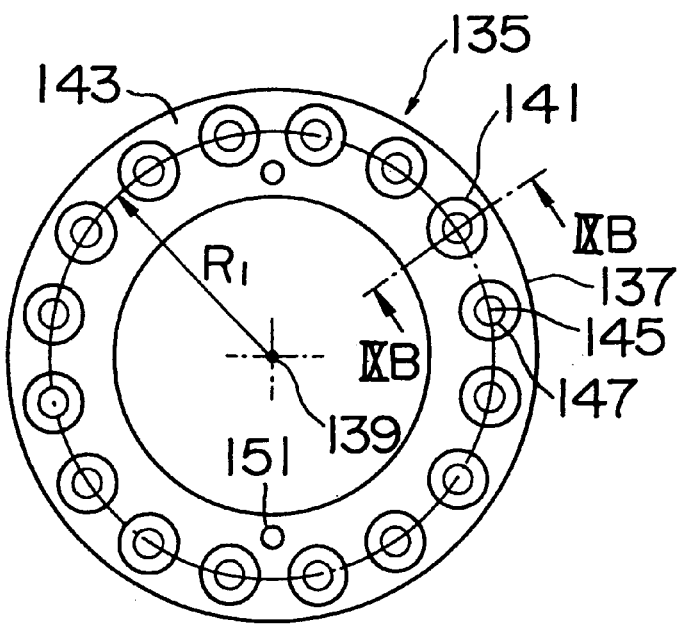
FIG. 9A is a front elevational view of a movable race section of the thrust ball bearing according to an embodiment of the present invention.
Figure 9B:
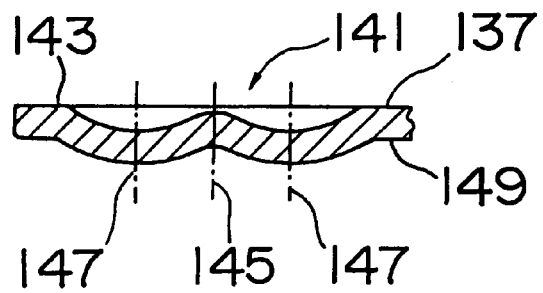
FIG. 9B is a sectional view taken along the line IXB—IXB in FIG. 9A.

Referring to FIGS. 9A and 9B, a movable race section 135 of the thrust ball bearing includes an annular race plate member 137 and embossed ball accommodating grooves 141 disposed on a concentric circle having a radius R1 about the central axis 139 of the race plate member 137.

As shown in FIG. 9B, each of the ball accommodating grooves 141, which has a shape similar to that of the stationary race section 117 shown in FIG. 8, includes, on the one surface 143 thereof, a central portion 145 and a ring-shaped concave groove portion 147 with a round bottom which is formed around the central portion 127. In contrast, the ball accommodating groove 141 forms, on the other surface 149 thereof, a ball transfer groove which includes a ring-shaped peripheral portion having an upper circular projection and a concave portion at the center thereof, contrary to the one surface 143 thereof.

Further, the movable race section 135 has fixing holes 151 formed at positions thereof which are located inside the concentric circle having the radius R1 to secure the movable race section 135 to the driving mechanism through pins.

Next, the shapes of the ball transfer grooves according to the first and second embodiments of the present invention will be described with reference to FIG. 10. Since the shape of the ball transfer groove shown in FIG. 8B is similar to that of the ball transfer groove shown in FIG. 9B, description will be made for FIG. 8B, and the description of the groove shape shown in FIG. 9B is omitted.

Figure 10:
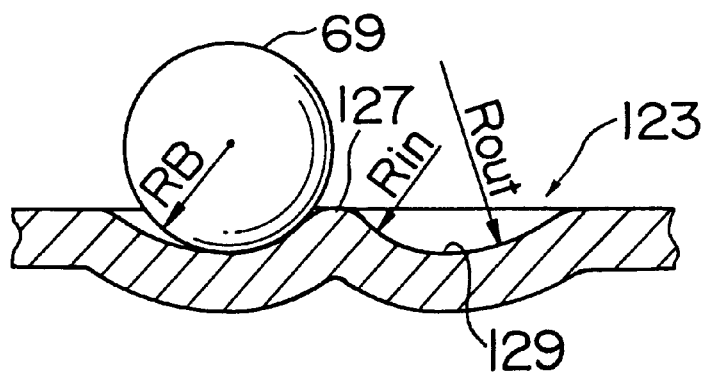
FIG. 10 is an enlarged view of FIG. 8A.

As shown in FIG. 10, the radius of curvature Rin of the cross section of the ball accommodating groove 123 inside a groove bottom portion 129 is set substantially the same as the radius of curvature RB of the thrust ball, whereas the radius of curvature Rout thereof outside the groove bottom portion 129 is set larger than the radius of curvature RB of the thrust ball. That is, the following formula (2) is established.

$$RB \leq Rin < Rout \qquad (2)$$

The difference between the contact areas of the outer and inner groove portions is corrected by the establishment of the relationship of the formula (2), whereby the service life of the coupling can be improved.

Next, to assemble the thrust ball bearing of the embodiments of the present invention, the movable race section 135 is confronted by the stationary race section 117 and the thrust balls 69 are accommodated in the ball accommodating grooves 123 and 141, respectively to thereby form the thrust ball bearing.

As described above, according to the embodiments of the present invention, a thrust ball bearing can be provided which is used in a scroll type compressor and the like which can improve the stress limit and durability of the ball accommodating grooves thereof and which has a long service life, as well as providing a scroll type compressor using the thrust ball bearing.

What is claimed is:

1. A scroll type compressor including a pair of swirl members disposed in a casing in confrontation with each other and discharging drawn refrigerant while compressing it by executing a relative turning motion by one of the pair of swirl members while preventing the rotation of the one swirl member with respect to the other swirl member by a rotation preventing mechanism substantially composed of a thrust ball bearing, the thrust ball bearing including a first annular race section, a second annular race section disposed in confrontation with the first annular race section, thrust balls interposed between the first and second annular race sections, the first and the second annular race sections having ball accommodating grooves formed to each of the confronting surfaces of the first and second race sections in which the thrust balls are accommodated so as to turn in a direction along the confronting surfaces, wherein each of the ball accommodating grooves of at least one of the first and second annular race sections has a central portion and a groove bottom portion around the central portion, and the ball accommodating groove has a shape satisfying the relationship of an inequality $RB \leq Rin < Rout$, when the radius of curvature of the thrust ball, the radius of curvature of the cross section of each of the ball accommodating grooves inside the groove bottom portion, and the radius of curvature thereof outside the groove bottom portion are represented by RB, Rin, and Rout, respectively.

2. A scroll type compressor according to claim 1, wherein:
   one of the pair of swirl members is a stationary swirl member fixed in the casing, the other of the pair of swirl members is a movable swirl member which executes a tuning motion while the rotation thereof is prevented by the rotation preventing mechanism with respect to the stationary swirl member; and
   the first race section is a stationary race section fixed in the casing of the scroll type compressor and the second race section is a movable race section fixed to the back surface of the movable swirl member.

3. A scroll type compressor according to claim 1, wherein the ball accommodating grooves are formed by embossing.

4. A scroll type compressor according to claim 1, wherein the first race section includes a stationary race and a ring, and the second race section includes a movable race and a ring.

5. A rotation preventing mechanism substantially composed of a thrust ball bearing including a first annular race section, a second annular race section disposed in confrontation with the first annular race section, thrust balls interposed between the first and second annular race sections, the first and the second annular race sections having ball accommodating grooves formed at each of the confronting surfaces of the first and second race sections in which the thrust balls are accommodated so as to turn in a direction along the confronting surfaces, wherein each of the ball accommodating grooves of at least one of the first and second race sections has a central portion and a groove bottom portion around the central portion, and the ball accommodating groove has a shape satisfying the relationship of an inequality $RB \leq Rin < Rout$, when the radius of curvature of the thrust ball, the radius of curvature of the cross section of each of the ball accommodating grooves inside the groove bottom portion are represented by RB, Rin, and Rout, respectively.

6. A rotation preventing mechanism according to claim 5, wherein the first race section is a stationary race section fixed in the casing of a scroll type compressor, and the second race section is a movable race section fixed to the back surface of the movable swirl of the scroll type compressor.

7. A rotation preventing mechanism according to claim 5, wherein the ball accommodating grooves are formed by embossing.

8. A rotation preventing mechanism according to claim 5, wherein the first race section includes a stationary race and a ring, and the second race section includes a movable race and a ring.

* * * * *